(12) United States Patent
Niki et al.

(10) Patent No.: US 7,059,435 B2
(45) Date of Patent: Jun. 13, 2006

(54) CONTROL APPARATUS FOR HYBRID VEHICLE

(75) Inventors: Manabu Niki, Utsunomiya (JP);
Masanobu Asakawa, Utsunomiya (JP);
Kohei Hanada, Utsunomiya (JP);
Minoru Suzuki, Shimotsuga-gun (JP);
Toshitaka Hachiro, Utsunomiya (JP);
Kazuhiko Kitano, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 10/879,747

(22) Filed: Jun. 30, 2004

(65) Prior Publication Data
US 2005/0003928 A1   Jan. 6, 2005

(30) Foreign Application Priority Data
Jul. 4, 2003   (JP) .............................. 2003-192312

(51) Int. Cl.
*B60K 6/04* (2006.01)

(52) U.S. Cl. ................. 180/65.2; 180/65.3; 180/65.4; 903/941; 903/942; 903/943; 903/946

(58) Field of Classification Search .............. 180/65.1, 180/65.2, 65.3, 65.4
See application file for complete search history.

(56) References Cited

U.S. PATENT DOCUMENTS 6,470,983 B1* 10/2002 Amano et al. ............. 180/65.2
2001/0039230 A1* 11/2001 Severinsky et al. ............ 477/3

FOREIGN PATENT DOCUMENTS

JP          09-163509          6/1997

* cited by examiner

*Primary Examiner*—Christopher P. Ellis
*Assistant Examiner*—John Walters
(74) *Attorney, Agent, or Firm*—Arent Fox PLLC

(57) ABSTRACT

An object is to improve fuel consumption efficiency while maintaining a desired driving force. Accordingly, in a case where an assisting possibility of a motor M is increased accompanying a relatively high state of charge SOC of a battery (YES side in step S02), and moreover in a case where a required torque TQAPCC is less than a predetermined value (NO side in step S03 or YES side in step S04), a "1" is set to a flag value of an LC_ON assistance flag F_LCOAST, and in a region for an accelerator pedal opening AP, and a vehicle speed VP, a region which maintains an LC_ON state where a lock-up clutch 21 is in an engaged state is enlarged compared to for a normal state where the flag value of the LC_ON assistance flag F_LCOAST is "0". In the LC_ON region enlarging state, it is determined whether or not it is possible to shift to the normal state, according to the state of charge SOC and the required torque TQAPCC (step S07 to step S09).

2 Claims, 5 Drawing Sheets

CONTROL APPARATUS FOR HYBRID VEHICLE

BACKGROUND OF THE INVENTION

Priority is claimed to Japanese application No. 2003-192312, filed Jul. 4, 2003, which are incorporated herein by reference.

FIELD OF THE INVENTION

The present invention relates to a control apparatus for a hybrid vehicle which is mounted in a hybrid vehicle propulsion driven by jointly using an internal-combustion engine and a motor, and wherein the driving force from at least one of the internal-combustion engine and the motor is transmitted to the driving wheels.

DESCRIPTION OF RELATED ART

Conventionally, for example, in a hybrid vehicle which comprises an internal-combustion engine and a motor as a power source and wherein the driving force from at least one of the internal-combustion engine and the motor is transmitted to the driving wheels for propulsion, a control apparatus for a hybrid vehicle has been well known which calculates the throttle opening for minimizing the fuel consumption of the internal-combustion engine with respect to the rotating speed of the input shaft of the transmission, and based on this throttle opening and the accelerator operation quantity of a driver, allocates the torque required by the power plant (that is, the internal-combustion engine and the motor), to the engine torque required by the internal-combustion engine and to the motor torque required by the motor (for example, refer to Japanese Unexamined Patent Application, First Publication No. Hei 9-163509).

Incidentally, in a control apparatus for a hybrid vehicle according to an example of the above conventional technique, comprising a torque converter installed with a lock-up clutch, wherein the output from the internal combustion engine or the motor is transmitted to a transmission through the torque converter, the arrangement is such that, for example when improving the transmission efficiency or the fuel consumption efficiency during low load travelling of the vehicle or during a regenerative operation of the motor, the lock-up clutch of the torque converter is set to an engaged state so as to suppress torque loss in the torque converter.

On the other hand, for example during high load travelling such as while accelerating the vehicle, the setting is such that the engagement of the lock-up clutch is cancelled so as to transmit a desired torque due to torque amplification of the torque converter.

Moreover, in such a control apparatus for a hybrid vehicle, it is desired that, for example, with respect to a vehicle state quantity such as the accelerator pedal opening related to an operating quantity of the accelerator by the driver, the engine rotating speed, or the like, by enlarging a predetermined vehicle state quantity region to maintain an LC_ON state where the lock-up clutch is set to the engaged state, fuel consumption efficiency is improved.

SUMMARY OF THE INVENTION

The present invention takes the above situation into consideration, with an object of providing a control apparatus for a hybrid vehicle in which fuel consumption efficiency can be improved while ensuring a predetermined driving force.

In order to solve the above problem and achieve the related object, a control apparatus for a hybrid vehicle of a first aspect of the present invention comprises an internal-combustion engine and a motor as a power source, and a power storage unit which transfers electric energy with the motor (for example, the battery 3 in the embodiment), and at least one of the internal-combustion engine and the motor is connected to driving wheels of the vehicle through a torque converter having a lock-up clutch, and a transmission, so as to transmit a driving force to the driving wheels, and there is provided; a state of charge detecting device (for example, the HVECU 35 in the embodiment) which detects a state of charge of the power storage unit; and a lock-up clutch controlling device (for example, the AT-CPU 47 in the embodiment) which controls an operating state of the lock-up clutch based on the state of charge detected by the state of charge detecting device or a state quantity related to the state of charge (for example, the high load side correction coefficient KTQMAX in the embodiment).

According to the control apparatus for a hybrid vehicle of the above construction, by controlling the operating state of the lock-up clutch based on the state of charge of the power storage unit which transfers electric energy with the motor, it is possible to improve the fuel consumption efficiency while maintaining the desired driving force.

For example when the lock-up clutch is set in the engaged state, in the case where the state of charge of the power storage unit is relatively large, by increasing the motor torque output from the motor according to the increase in the target torque for the power plant torque output from the power plant, the engaged state of the lock-up clutch can be maintained, and for example, the frequency of occurrence of a state where the engine speed is rapidly increased due to release of the engaged state of the lock-up clutch, so that the fuel consumption is over increased, can be reduced.

Furthermore, in a control apparatus for a hybrid vehicle of a second aspect of the present invention, the lock-up clutch controlling device sets the lock-up clutch in an engaged state in a case where a vehicle state quantity is in a predetermined vehicle state quantity region, and there is provided an engagement region enlarging device (for example, step S06 in the embodiment) which enlarges the predetermined vehicle state quantity region which sets the lock-up clutch in the engaged state, in a case where the state of charge or a state quantity related to the state of charge is greater than a predetermined first threshold (for example, the high side correction coefficient #KTQLCOAH in the embodiment).

According to the control apparatus for a hybrid vehicle of the above construction, the engagement region enlarging device determines whether the state of charge or a state quantity related to the state of charge of the power storage unit which transfers electric energy with the motor is greater than the predetermined first threshold, for example, a predetermined determination threshold for a state of charge for determining whether or not it is possible to execute an assisting operation by the motor (that is an operation which assists the output of the internal combustion engine by means of the output from the motor), according to an energy state in high voltage electrical equipment comprising a power storage unit, or various accessories. If it is determined that the state of charge is greater than the predetermined first threshold, then for example the predetermined engaged state set for the vehicle state quantity such as the accelerator pedal opening or the engine rotating speed, that is the predetermined vehicle state quantity region which sets the lock-up clutch in the engaged state, is enlarged. Therefore, in the case where there is time for the assisting operation of the motor, the frequency of occurrence of a state where the engine rotating speed is rapidly increased due to release of the engaged state of the lock-up clutch, so that the fuel consumption is over increased, can be reduced, so that it is possible to improve the fuel consumption efficiency while maintaining the desired driving force.

Furthermore, in a control apparatus for a hybrid vehicle of a third aspect of the present invention, there is provided a canceling device (for example, step S11 in the embodiment) which cancels an operation of the engagement region enlarging device in a case where, during operation of the engagement region enlarging device, the state of charge or a state quantity related to the state of charge is less than a predetermined second threshold (for example, the low side correction coefficient #KTQLCOAL in the embodiment), and a target torque for a power plant torque output from a power plant being the internal combustion engine and the motor (for example, the required torque TQAPCC in the embodiment) is increased greater than a predetermined first torque (for example, the torque calculation value during LC_OFF, TQLCOAOF in the embodiment), or decreased less than a predetermined second torque (for example, a value obtained by subtracting from the WOT assistance start torque TQWOTAST, a predetermined torque subtraction item #DTQLCOAL in the embodiment).

According to the control apparatus for a hybrid vehicle of the above construction, in the state where the predetermined vehicle state quantity region which sets the lock-up clutch in the engaged state is enlarged, then in the case where the state of charge or a state quantity related to the state of charge is decreased less than the predetermined second threshold, for example drops below the predetermined determination threshold for the state of charge for determining whether or not it is possible to execute the assisting operation by the motor (that is the operation which assists the output of the internal combustion engine by means of the output from the motor) according to the energy state in high voltage electrical equipment comprising a power storage unit or various accessories, it is further determined whether or not the target torque for the power plant torque is increased greater than the predetermined first torque or decreased less than the predetermined second torque. In this determination, for example according to the increase in the operating quantity of the accelerator according to the driver's intention to accelerate, in the case where the target torque is increased greater than the predetermined first torque, for example the predetermined determination threshold which determines that torque amplification in the torque converter is necessary, the cancellation device cancels the operation of the engagement region enlarging device. Accompanied with this, the engaged state of the lock-up clutch is cancelled by the lock-up clutch controlling device, and according to the increase in the target torque for the power plant torque, the torque is amplified in the torque converter. Moreover, according to the decrease in the operating quantity of the accelerator according to the driver's intention to decelerate, in the case where the target torque is decreased less than the predetermined second torque, for example the predetermined determination threshold which determines that it is possible to set the lock-up clutch in the engaged state without the necessity to enlarge the engagement region, the canceling device determines that it is not necessary to enlarge the engagement region and cancels the operation of the engagement region enlarging device. Consequently, since the operating state of the engagement region enlarging device is not changed simply by the decrease in the state of charge, and furthermore the operating state of the engagement region enlarging device is changed at the point in time when the change in the operating quantity of the accelerator by the driver is detected, then for example in the case where the target torque related to the driver's travelling intention is unchanged, it is possible to prevent the occurrence of torque fluctuations unexpected by the driver, so as to appropriately reflect the driver's intention in the travelling behavior of the vehicle.

Furthermore, in a control apparatus for a hybrid vehicle of a fourth aspect of the present invention there is provided an operating device (for example, step S02 to S04 and step S06 in the embodiment) which operates the engagement region enlarging device in a case where, during non-operation of the engagement region enlarging device, the state of charge or a state quantity related to the state of charge is more than a predetermined first threshold, and a target torque for a power plant torque output from a power plant being the internal combustion engine and the motor (for example, the required torque TQAPCC in the embodiment) is decreased less than a predetermined torque (for example, the torque calculation value during LC_ON, TQLCOAON or a value obtained by subtracting from the WOT assistance start torque TQWOTAST, the predetermined torque subtraction item #DTQLCOAL in the embodiment).

According to the control apparatus for a hybrid vehicle of the above construction, in a state where the predetermined vehicle state quantity region which sets the lock-up clutch in the engaged state is not enlarged, then in the case where the state of charge or a state quantity related to the state of charge is increased greater than the predetermined first threshold, it is further determined whether or not the target torque for the power plant torque is decreased less than the predetermined torque. In this determination, for example according to the decrease in the operating quantity of the accelerator according to the driver's intention to decelerate, in the case where the target torque is decreased less than the predetermined torque, for example decreased less than the predetermined determination threshold for determining the presence/absence of the driver's intention to accelerate, the operating device operates the engagement region enlarging device. Consequently, since the operating state of the engagement region enlarging device is not changed simply by the increase in the state of charge, and furthermore the operating state of the engagement region enlarging device is changed at the point in time when the change in the operating quantity of the accelerator by the driver is detected, then for example it is possible to prevent the occurrence of the lockup clutch being unnecessarily set to the engaged state in the case where there is an intention of the driver to accelerate, so that the driver's intention can be appropriately reflected in the travelling behavior of the vehicle.

DETAILED DESCRIPTION OF THE INVENTION

Hereunder is a description of a control apparatus for a hybrid vehicle according to an embodiment of the present invention with reference to the appended drawings.

Figure 1:
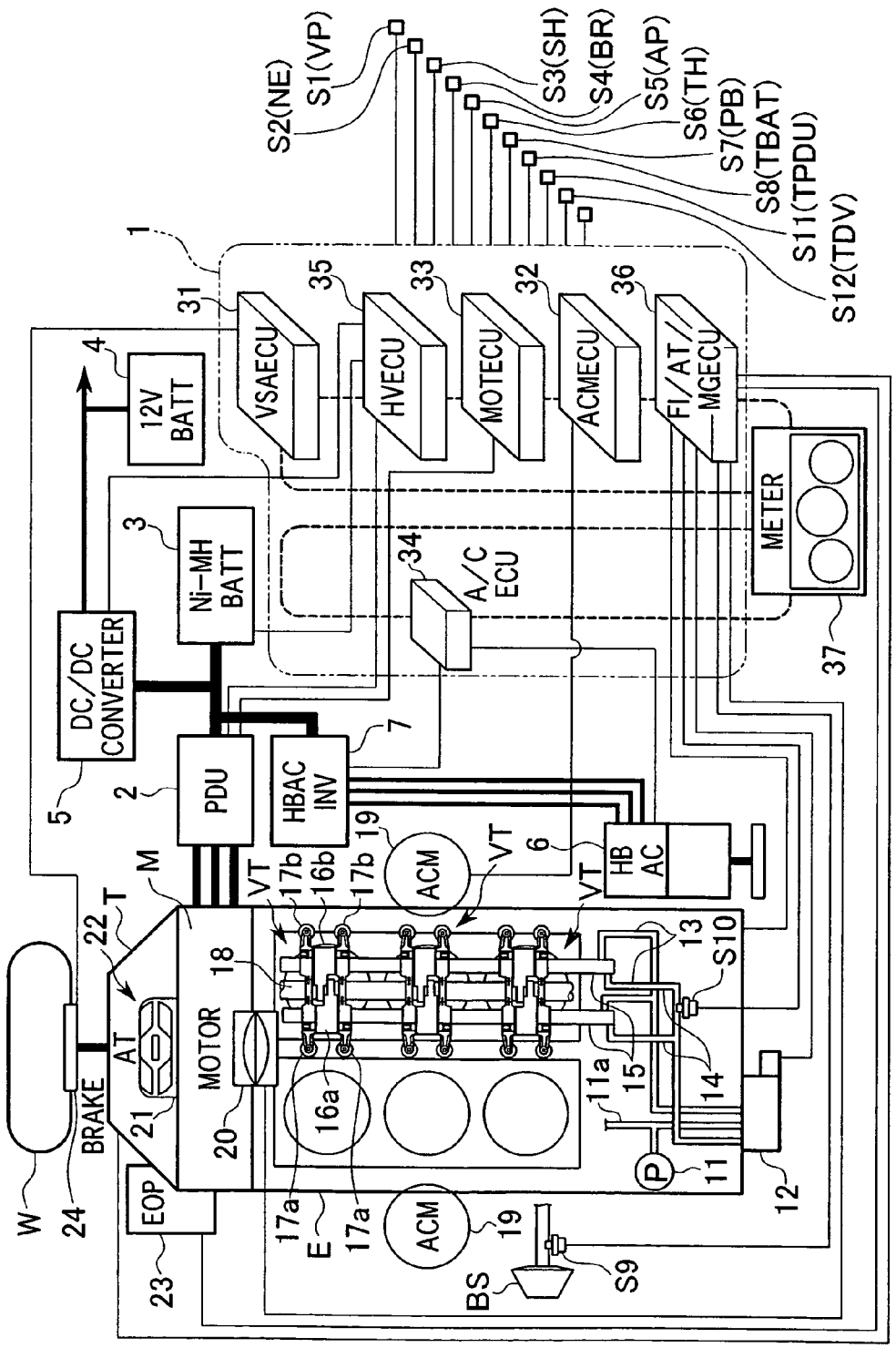
FIG. 1 shows a construction of a control apparatus for a hybrid vehicle according to an embodiment of the present invention.

FIG. 1 shows a parallel hybrid vehicle according to the embodiment of this invention having a construction where an internal-combustion engine E, a motor M, and a transmission T are connected directly in series. The driving force of both the internal-combustion engine E and the motor M is transmitted, for example, from the transmission T such as an automatic transmission (AT) or manual transmission (MT) to the driving wheels W of the vehicle, via a differential gear (not shown) which distributes the driving force between driving wheels W on the right and the left (front wheels or rear wheels). Moreover, when a driving force is transmitted from the driving wheel W side to the motor M side at the time of deceleration of the hybrid vehicle, the motor M functions as a generator to generate so-called regenerative braking, and the kinetic energy of the vehicle body is recovered as electrical energy.

The motor M, being for example a three-phase brushless DC motor or the like, is connected to a power drive unit (PDU) 2. The power drive unit 2 comprises, for example a PWM inverter involving pulse width modulation (PWM), installed with a bridge circuit being a bridge connected using a plurality of transistor switching elements, and is connected to a nickel-hydrogen battery (battery) 3 of a high voltage system which transfers the power for the motor M (the power supply which is supplied to the motor M during the power running operation (driving or assisting) of the motor M, or the regenerated power which is output from the motor M during the regenerative operation). Moreover, the drive and regenerative operation are performed by the power drive unit 2 receiving control instructions from a control unit 1. That is, for example when driving the motor M, based on torque instructions input from the control unit 1, the power drive unit 2 converts the DC power output from the battery 3 into three-phase AC power and supplies this to the motor M. On the other hand, during the regenerative operation of the motor M, the three-phase AC power output from the motor M is converted into the DC power and the battery 3 is charged.

Furthermore, an auxiliary battery 4 of 12 volts for driving various accessories, is connected to the power drive unit 2 and the battery 3 in parallel via a downverter 5 which is a DC-DC converter. The downverter 5 is controlled by the control unit 1 and charges the auxiliary battery 4 by lowering the voltage of the power drive unit 2 or the battery 3.

Moreover, a crankshaft of the internal-combustion engine E is connected, for example through a belt or a clutch to a rotation shaft of an air conditioning motor (not shown) equipped in a hybrid air conditioning compressor (HBAC) 6. This air conditioning motor is connected to an air conditioning inverter (HBAC INV) 7. The air conditioning inverter 7 is connected in parallel to the power drive unit 2 and the battery 3, and under the control of the control unit 1, converts the DC power output from the power drive unit 2 and the battery 3 into three-phase AC power to supply to the air conditioning motor so as to drive control the hybrid air conditioning compressor 6.

That is, in the hybrid air conditioning compressor 6, the driving load, for example the discharge of the refrigerant, is variably controlled under the driving force from at least one of the internal-combustion engine E and the air conditioning motor during the power running operation of the air conditioning motor. Here, "hybrid" in the hybrid air conditioning compressor 6 means that it can be driven by either one of the internal-combustion engine E and the motor M.

Between the internal-combustion engine E and the air conditioning motor, there are for example, a crankshaft pulley integrally provided with the crankshaft of the internal-combustion engine E, a driving shaft pulley paired with the crankshaft pulley and integrally provided with a driving shaft connectable with the rotation shaft of the air conditioning motor through a clutch, and a belt spanning between the crankshaft pulley and the driving shaft pulley. That is, between the crankshaft pulley and the driving shaft pulley, the driving force is transmitted through the belt.

Moreover, the internal-combustion engine E is a so-called SOHC V6 cylinder engine, of a construction having three cylinders on one bank comprising a variable valve timing mechanism VT enabling a cylinder deactivation operation, and a construction having three cylinders on the other bank comprising a normal valve operating mechanism (not shown) which does not perform the cylinder deactivation operation. Furthermore, the three cylinders enabling the cylinder deactivation operation have a construction such that respective two inlet valves and two exhaust valves are able to maintain the closed state by means of the variable timing mechanism VT, via an oil pressure pump 11, a spool valve 12, a cylinder deactivation side path 13, and a cylinder deactivation cancellation side path 14. That is, the internal-combustion engine E may be switched between three cylinders operation (cylinder deactivation operation) in the state such that the three cylinders on one side bank are deactivated, and six cylinders operation (all cylinders operation) such that all six cylinders on both side banks are driven.

Specifically, if operating oil being supplied from the oil pressure pump 11 through the lubrication system piping 11a to the engine lubrication system is partially supplied via the spool valve 12 comprising a solenoid controlled by the control unit 1, to the cylinder deactivation side path 13 on the bank capable of cylinder deactivation operation, a cam lift rocker arm 16a (16b) and valve drive rocker arms 17a (17b) which are supported on the respective rocker shafts 15 and were integrally driven, are able to be driven separately. Therefore, the driving forces of the cam lift rocker arms 16a and 16b driven by the rotation of the cam shaft 18 are not transmitted to the valve drive rocker arms 17a and 17b, so that the inlet valves and the exhaust valves remain in the closed state. Accordingly the cylinder deactivation operation where the inlet valves and the exhaust valves of the three cylinders become in the closed state may be performed. The internal-combustion engine E is mounted via a damping device (ACM: Active Control Engine Mount) 19 onto the vehicle so that the damping device 19 can suppress the generation of vehicle vibration accompanied with the operating state of the internal-combustion engine E, that is the switching of the three cylinders operation (cylinder deactivation operation) and the six cylinders operation (all cylinders operation).

Moreover, this internal-combustion engine E comprises an electronic throttle control system (ETCS) 20 which electronically controls a throttle valve (not shown).

The ETCS 20 drives an ETCS driver according to the throttle opening calculated in the control unit 1 based for example on the accelerator pedal opening related to the operating quantity of the accelerator pedal (not shown) by a driver, the operating state of the vehicle such as the vehicle travelling speed (vehicle speed) VP or the engine speed NE, and on the torque distribution between the internal-combustion engine E and the motor M, so as to directly control the throttle valve.

For example the transmission T being the automatic transmission (AT) is constructed to comprise a torque converter 22 equipped with a lock-up clutch (LC) 21, and an electric oil pump 23 which generates the oil pressure for drive controlling the torque converter 22 and for the shifting operation of the transmission T. The electric oil pump 23 is drive controlled by the control unit 1 with the power supply from the battery 3.

The torque converter 22 transmits the torque by a spiral flow of the operating oil (ATF: Automatic Transmission Fluid) enclosed inside. In an LC_OFF state where the engagement of the lock-up clutch 21 is cancelled, the torque is transmitted (for example, amplification transmission) from the rotation shaft of the motor M to the input shaft of the transmission T via the operating oil.

Furthermore, in an LC_ON state where the lock-up clutch 21 is set up in the engagement state, the rotation driving force is directly transmitted from the rotation shaft of the motor M to the input shaft of the transmission T and not via the operating oil.

Moreover, a booster BS is linked to the brake pedal (not shown). A master power internal negative pressure sensor S9 which detects the brake master power internal negative pressure is provided in the booster BS.

Moreover, the driving wheel W comprises a brake device 24. The brake device 24 suppresses the generation of rapid behavioral change of the vehicle by control of the control unit 1. For example, it prevents slipping of the driving wheel W on a slippery road surface or the like, suppresses side slip such as oversteering or understeering, prevents the driving wheel W from being in a locked state during braking, ensures the desired driving force and the steering performance of the vehicle, stabilizes the posture of the vehicle, and assists with travelling by means of a creep force, for example, prevents the vehicle from moving backward on a slope when deactivating the internal-combustion engine E.

Inputs to the control unit 1 are: for example: a detection signal from a vehicle speed sensor S1 which detects the travelling speed of the vehicle VP, a detection signal from an engine speed sensor S2 which detects the engine speed NE, a detection signal from a shift position sensor S3 which detects the shift position SH of the transmission T, a detection signal from a brake switch S4 which detects the operating state BR of the brake (Br) pedal, a detection signal from an accelerator pedal opening sensor S5 which detects the accelerator pedal opening AP according to the operation quantity of the accelerator pedal, a detection signal from a throttle opening sensor S6 which detects the throttle opening TH, a detection signal from an intake pipe pressure sensor S7 which detects the intake pipe pressure PB, a detection signal from a battery temperature sensor S8 which detects the temperature TBAT of the battery 3, a detection signal from the master power internal negative pressure sensor S9, a detection signal from a POIL sensor S10 which detects the oil pressure of the cylinder deactivation cancellation side path 14 when deactivating the cylinders, a detection signal from a PDU temperature sensor S11 which detects the temperature TPDU of the power drive unit 2, and a detection signal from a DV temperature sensor S12 which detects the temperature TDV of the downverter 5.

Moreover, the control unit 1 comprises: for example: a VSA (Vehicle Stability Assist) ECU 31 which drive controls the brake device 24 to stabilize the behavior of the vehicle, an ACMECU 32 which drive controls the damping device 19 to suppress the generation of car body vibration caused by the operating state of the internal-combustion engine E, a MOTECU 33 which controls the driving and the regenerative operation of the motor M, an A/CECU 34 which drive controls the air conditioning hybrid air conditioning compressor 6 and the air conditioning inverter 7, and an HVECU 35 which monitors and protects the high voltage electrical equipment system comprising for example the power drive unit 2, the battery 3, the downverter 5, and the motor M, and controls the operation of the power drive unit 2 and the downverter 5, and a FI/AT/MGECU 36 The respective VSAECU 31 to 36 are mutually connected communicably. The respective ECUs 31 to 36 are connected to a meter 37 comprising instruments which display the quantity of the respective types of states.

Figure 2:
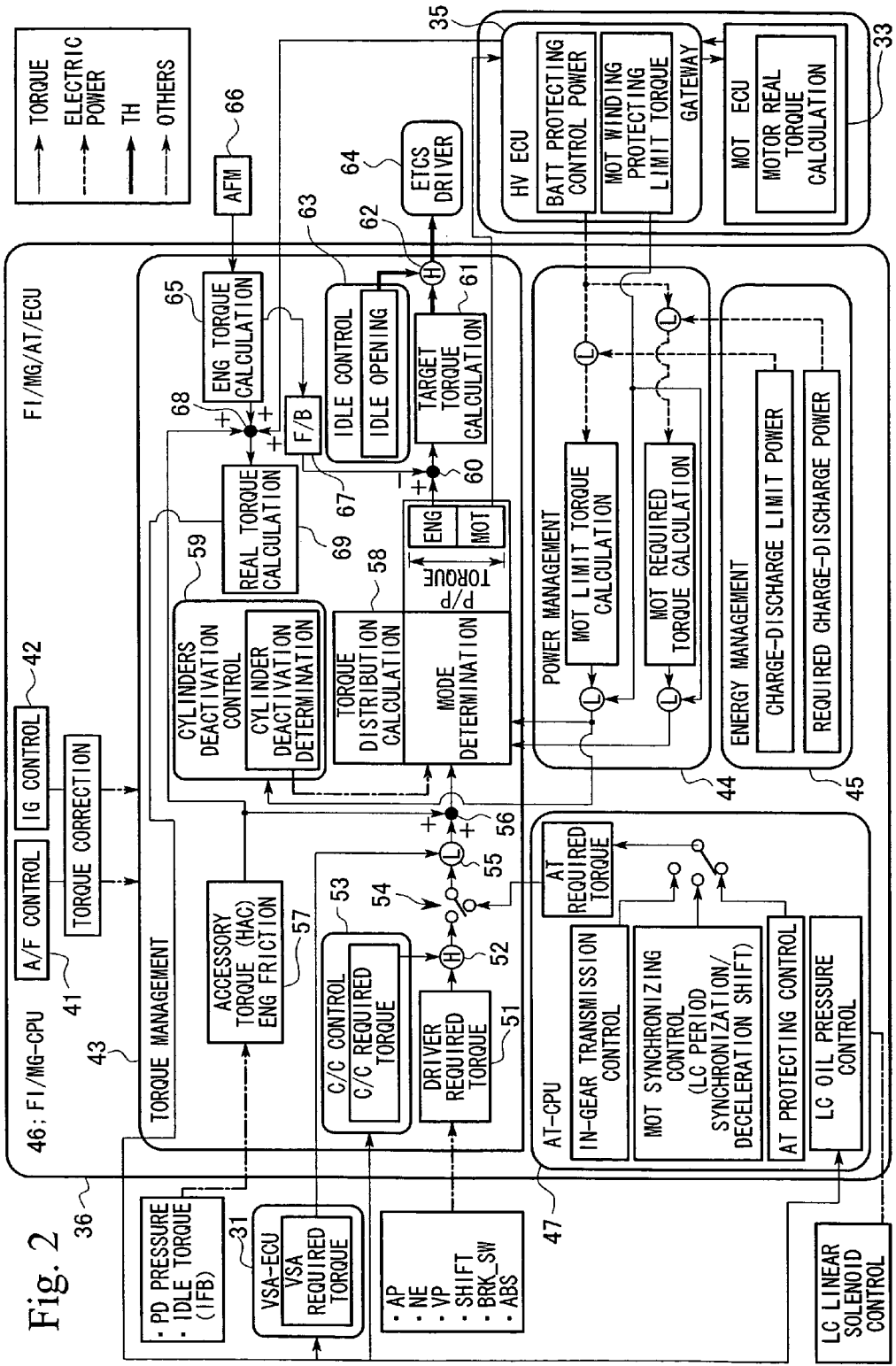
FIG. 2 is a block diagram of the control unit shown in FIG. 1.

For example, as shown in FIG. 2, the FI/AT/MGECU 36 comprises; a FI/MG-CPU 46 installed with an A/F (air/fuel ratio) control unit 41 and an IG (ignition) control unit 42 which control the fuel supply to and the ignition timing of the internal-combustion engine E, a torque management section 43, a power management section 44, and an energy management section 45; and for example an AT-CPU 47 which controls the shifting operation of the transmission T, the operating state of the lock-up clutch 2, and the like.

In the torque management section 43, a driver required torque calculating section 51 calculates the torque value required by a driver of the vehicle (driver required torque) depending on the operation quantity of the accelerator by the driver, for example based on respective detection signals from the accelerator pedal (AP) opening, the engine speed NE, the vehicle travelling speed VP, the shift position SH, the operating state of a brake pedal BRK_SW, and the operating state ABS of an antilock brake system which prevents the driving wheels W from being locked during vehicle braking by the brake device 24, and outputs this torque value to a first torque selecting section 52.

Moreover, a C/C (cruise control) unit 53 calculates the torque value (C/C required torque) targeted during the travel control satisfying predetermined traveling conditions previously set according to the input operation of the driver, that is cruise control, for example, such as the constant speed travelling control which controls the internal-combustion engine E and the motor M so that the vehicle travelling speed VP detected in a vehicle speed sensor S1 becomes the target vehicle speed which is the target value of the travelling speed of the vehicle, and follow travel control for following a preceding vehicle while maintaining a predetermined vehicular gap, and outputs the torque value to the first torque selecting section 52.

The first torque selecting section 52 selects the greater torque value of the driver required torque or the C/C required torque, and outputs to the torque switching section 54. Therefore, for example even during cruise control, in the case where the driver required value according to the accelerator operation of the driver of the vehicle is over the C/C required torque, the torque according to the driver required value is output.

The torque switching section 54 selects either one of the torque value input from the first torque selecting section 52 and the AT required value input from the AT-CPU 47, and outputs to a second torque selecting section 55.

The AT-CPU 47 selects either one of the torque values as the AT required torque among, for example: a torque value set during the shifting operation of the transmission T, a torque value targeted when performing synchronizing control which synchronize the period of the input shaft of the transmission T and the rotating speed of the motor M during driving the lock-up clutch 21 or shifting the speed such as shifting down, and a torque value set during protection control of the transmission T in the case where a driver operates the accelerator pedal and the brake pedal at the same time.

Moreover, the AT-CPU 47 electronically controls the oil pressure which drives the lock-up clutch 21 by an LC linear solenoid, and it is possible to set the operation, in addition to the LC_ON state where the lock-up clutch 21 is in the engagement state and the LC_OFF state where the engagement is cancelled, to an intermediate state which generates an appropriate smoothness in the lock-up clutch 21.

The second torque selecting section 55 selects the smaller torque value of the torque value input from the torque switching section 54 and the VSA required torque input from the VSAECU 31, then sets this torque value as a torque of the crankshaft (crankshaft torque), that is the target torque value with respect to the actual rotation of the driving wheels W, and outputs to a first adding section 56.

Moreover, an auxiliary torque-ENG friction calculating section 57 calculates, for example the auxiliary torque (HAC) required for driving the accessories based on the protrusive pressure (PD) of the air conditioner, calculates the torque value in relation to the engine (ENG) friction of the internal-combustion engine E based on the increased quantity of the engine friction in a low temperature state compared to a standard for the engine friction value after termination of warming up of the internal-combustion engine E, and outputs to the first adding section 56.

The first adding section 56 sets the value obtained by adding the crank terminal torque and the torque value input from the auxiliary torque-ENG friction calculating section 57, as the power plant (P/P) torque which is the target torque for the torque output from the power plant (that is, the internal-combustion engine E and the motor M), and outputs to a torque distribution calculating section 58.

The torque distribution calculating section 58 selects the required torque mode for instructing the predetermined operating state of the internal-combustion engine E and the motor M based on the cylinder deactivation determination output from the cylinder deactivation control unit 59 for determining whether the cylinder deactivation operation of the internal-combustion engine E should be executed or not, and the limit torque and the required torque with respect to the motor M output from the power management section 44, and according to the selection result, sets the distribution of the power plant torque (P/P) with respect to the respective torque instructions of the internal-combustion engine E and the motor M.

To the cylinder deactivation control unit 59 is input the limit torque for the motor M output from the power management section 44 described later, and according to the limit torque for the motor M, the cylinder deactivation control unit 59 determines whether the cylinder deactivation operation should be executed or not.

The power management section 44 calculates, for example the motor (MOT) limit torque based on the smaller power of the battery (BATT) protecting limit power output from the HVECU 35 and the charge-discharge limit power output from the energy management section 45, then sets the smaller one of the calculated motor limit torque and the motor (MOT) winding protecting limit torque output from the HVECU 35 as the limit torque, and outputs to the torque distribution calculating section 58 and the cylinder deactivation control unit 59.

Moreover, the power management section 44 calculates, for example the motor (MOT) limit torque based on the smaller power of the battery (BATT) protecting limit power output from the HVECU 35 and the required charge-discharge power output from the energy management section 45, then sets the smaller one of the calculated motor limit torque and the motor (MOT) winding protecting limit torque output from the HVECU 35 as the required torque, and outputs to the torque distribution calculating section 58.

The charge-discharge limit power and the required charge-discharge power output from the energy management section 45 are, for example the limited quantity and the required quantity with respect to charge and discharge set according to the state of charge of the battery 3 and the auxiliary battery 4.

Moreover, the battery (BATT) protecting limit power output from the HVECU 35 is, for example the limit value of the output power of the battery 3 set according to the temperature state of the battery 3, the auxiliary battery 4, and the other high voltage electrical equipment. The motor (MOT) winding protecting limit torque is the limit value of the output torque of the motor M set according to the temperature state of the motor M.

The torque instruction of the internal-combustion engine E calculated by the torque distribution calculating section 58 is input into a subtracting section 60. The subtracting section 60 inputs the value obtained by subtracting the torque value input from the feedback (F/B) processing section 67 described later from the torque instruction of the internal-combustion engine E, to a target TH calculating section 61. The target TH calculating section 61 calculates the target value for the electronic throttle opening TH in relation to the drive of the ETCS driver based on the input torque value, and outputs to a third torque selecting section 62.

The third torque selecting section 62 selects the greater throttle opening value of the target value of the electronic throttle opening TH input from the target TH and the idle opening output from the idle control unit 63, and outputs this throttle opening value to the ETCS driver 64.

The idle opening output from the idle control unit 63 is, for example, a limit value with respect to the throttle opening TH for preventing the engine speed NE from being less than the predetermined rotating speed during the idle operation of the internal-combustion engine E.

Moreover, to the ENG torque calculating section 65 in the torque management section 43 is input a detection signal intake air quantity (or supplied oxygen quantity) of the internal-combustion engine E detected by an airflow meter (AFM) 66. The ENG torque calculating section 65 calculates the ENG torque output from the internal-combustion engine E based on the detection value of the intake air quantity, and outputs to the feed back (F/B) processing section 67 and a second adding section 68.

The feed back (F/B) processing section 67, with respect to the torque instruction of the internal-combustion engine E calculated in the torque distribution calculating section 58, corrects for calculation errors of ENG torque based for example on the detection value of the airflow meter 66, response characteristic or aged deterioration of the internal-combustion engine E, performance irregularities during mass production of the internal-combustion engine E and the like, by feed back processing, and inputs the ENG torque calculated in the ENG torque calculating section 65 to the subtracting section 60.

A third adding section 68 inputs the torque value obtained by adding; the ENG torque calculated in the ENG torque calculating section 65, the torque value input from the auxiliary torque-ENG friction calculating section 57, and the motor real torque input from the MOTECU 33, to the real torque calculating section 69. The real torque calculating section 69 calculates the real torque value which is actually output from the power plant (that is, the internal-combustion engine E and the motor M) based on the input torque value.

To the MOTECU 33 is input the torque instruction of the motor M calculated by the torque distribution calculating section 58 in the torque management section 43, via the HVECU 35. The MOTECU 33 calculates the motor real torque which is actually output from the motor M based on the input torque value, and inputs to the third adding section 68 in the torque management section 43, via the HVECU 35.

Moreover, the real torque value calculated in the real torque calculating section 69 is input to the AT-CPU 47, and based on this real torque value, the oil pressure which drives the lock-up clutch 21 is electronically controlled by an LC linear solenoid.

The respective torque values calculated in the torque management section 43 are corrected according to the ignition timing, the air/fuel ratio, and the presence/absence of the fuel cut (fuel supply cancellation) of the internal-combustion engine E which are controlled in the A/F (air/fuel ratio) control unit 41 and the IG (ignition) control unit 42.

The control apparatus for a hybrid vehicle according to the present embodiment comprises the above construction. Next is a description of an operation of this control apparatus for a hybrid vehicle, particularly of processing for controlling the operating state of a lock-up clutch 21.

Figure 3:
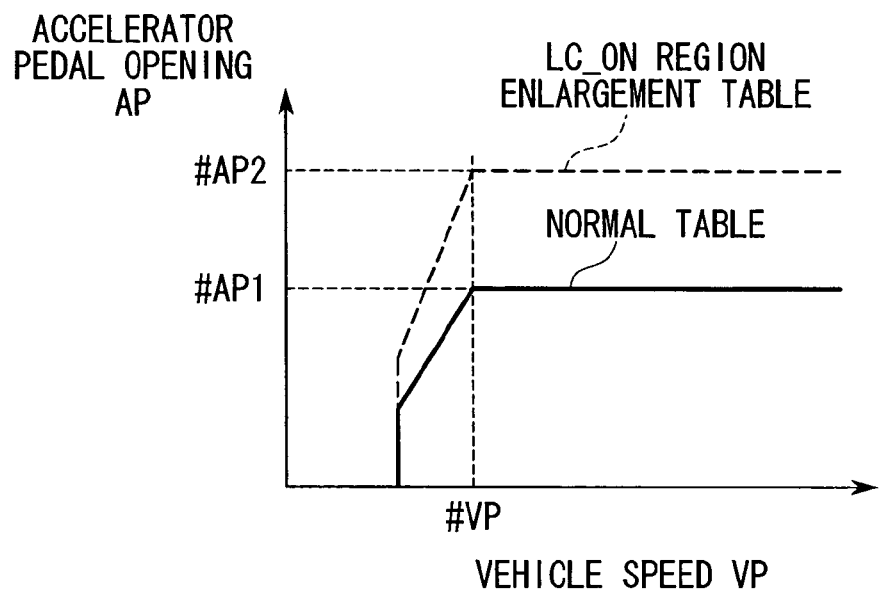
FIG. 3 is a graph showing a normal table and a LC_ON region enlargement table for specifying a predetermined switching position where the operating state of a lock-up clutch is switched with respect to accelerator pedal opening AP and vehicle speed VP.

The FI/AT/MGECU 36 switches the operating state of the lock-up clutch 21, that is the LC_ON state which is the engaged state, and the LC_OFF state which is the engagement canceling state, according to for example the accelerator pedal opening AP and the vehicle speed VP, and comprises, for example as shown in FIG. 3, two different tables for specifying predetermined switching positions with respect to the accelerator pedal opening AP (the detection value from the accelerator pedal opening sensor S5 or an estimate value during cruise control) and the vehicle speed VP, that is, a normal table and an LC_ON region enlargement table.

Here, in the LC_ON region enlargement table, the region of the LC_ON state is set large compared to the normal table. For example as shown in FIG. 3, in a region over a predetermined vehicle speed #VP, the accelerator pedal opening AP when switching from the LC_ON state to the LC_OFF state is set to a predetermined first accelerator pedal opening #AP1 in the normal table, and is set to a predetermined second accelerator pedal opening #AP2 (>#AP1) which is greater than the first accelerator pedal opening #AP1 in the LC_ON region enlargement table.

Figure 4:
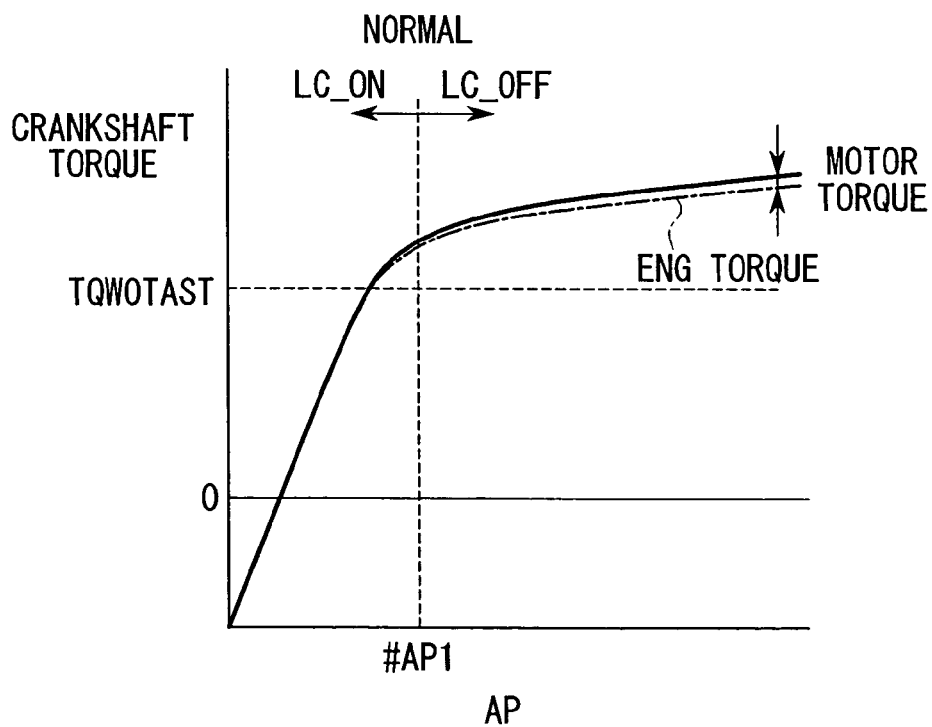
FIG. 4 is a graph showing a predetermined switching position where the operating state of the lock-up clutch is switched based on a normal table.

Moreover, the FI/AT/MGECU 36 exchanges these respective two tables according to a flag value of an LC_ON assistance flag F_LCOAST described later, so as to switch between the LC_ON state and the LC_OFF state. For example, in the case where the motor torque capable of being output from the motor M is relatively small due to a relatively low state of charge SOC of the battery 3, the normal table is selected. For example, as shown in FIG. 4, in a region over the predetermined vehicle speed #VP, at a point in time when the accelerator pedal opening AP becomes greater than the first accelerator pedal opening #AP1, the state is shifted from the LC_ON state to the LC_OFF state.

Figure 5:
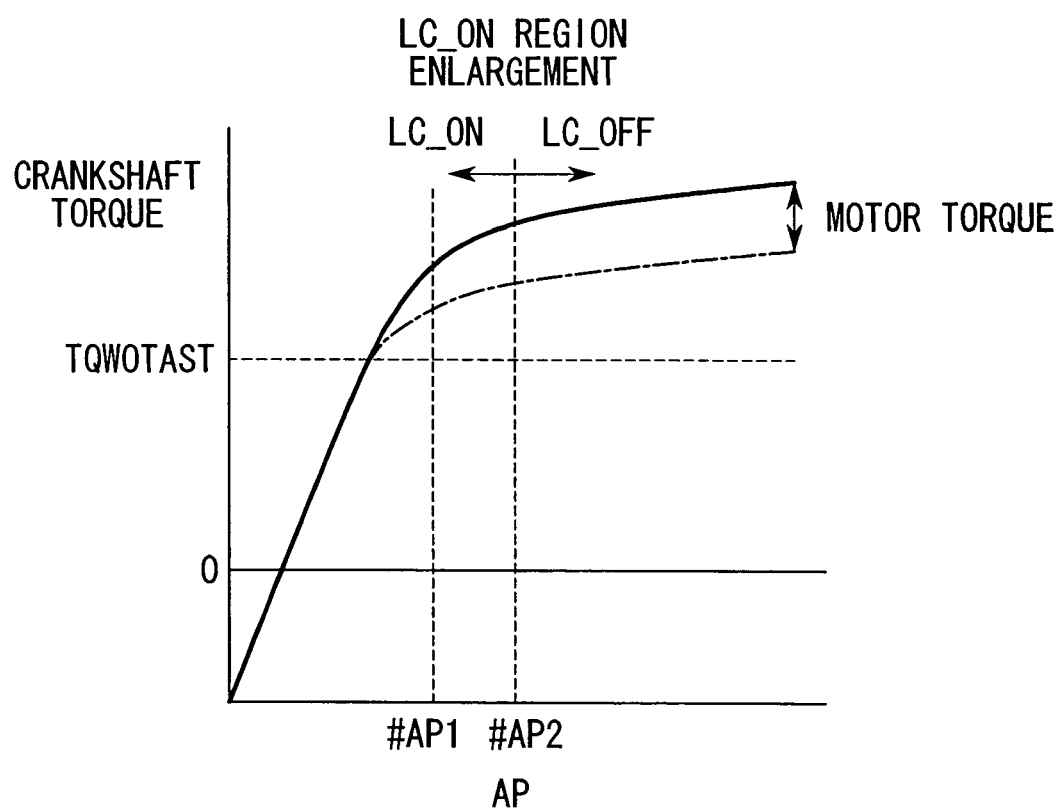
FIG. 5 is a graph showing a predetermined switching position where the operating state of the lock-up clutch is switched based on an LC_ON region enlargement table.

On the other hand, in the case where the motor torque capable of being output from the motor M is relatively large due to a relatively high state of charge SOC of the battery 3, the LC_ON region enlargement table is selected. For example as shown in FIG. 5, in a region over the predetermined vehicle speed #VP, at a point in time when the accelerator pedal opening AP is greater than the second accelerator pedal opening #AP2 (>#AP1), the state is shifted from the LC_ON state to the LC_OFF state. For example, accompanying a gradual increase in the accelerator pedal opening AP, a required torque for the output torque from the power plant is increased, and when this required torque reaches to a WOT assistance start torque TQWOTAS, WOT assistance for the output from the internal combustion engine E by the motor M is started. Furthermore, after the accelerator pedal opening AP is increased to reach the first accelerator pedal opening #AP1, the LC_ON state is sustained and the output of the motor M is increased so that the output torque from the power plant becomes equivalent to the required torque.

Hereunder is a description of processing which sets the LC_ON assistance flag F_LCOAST, with reference to the flowcharts.

Figure 6:
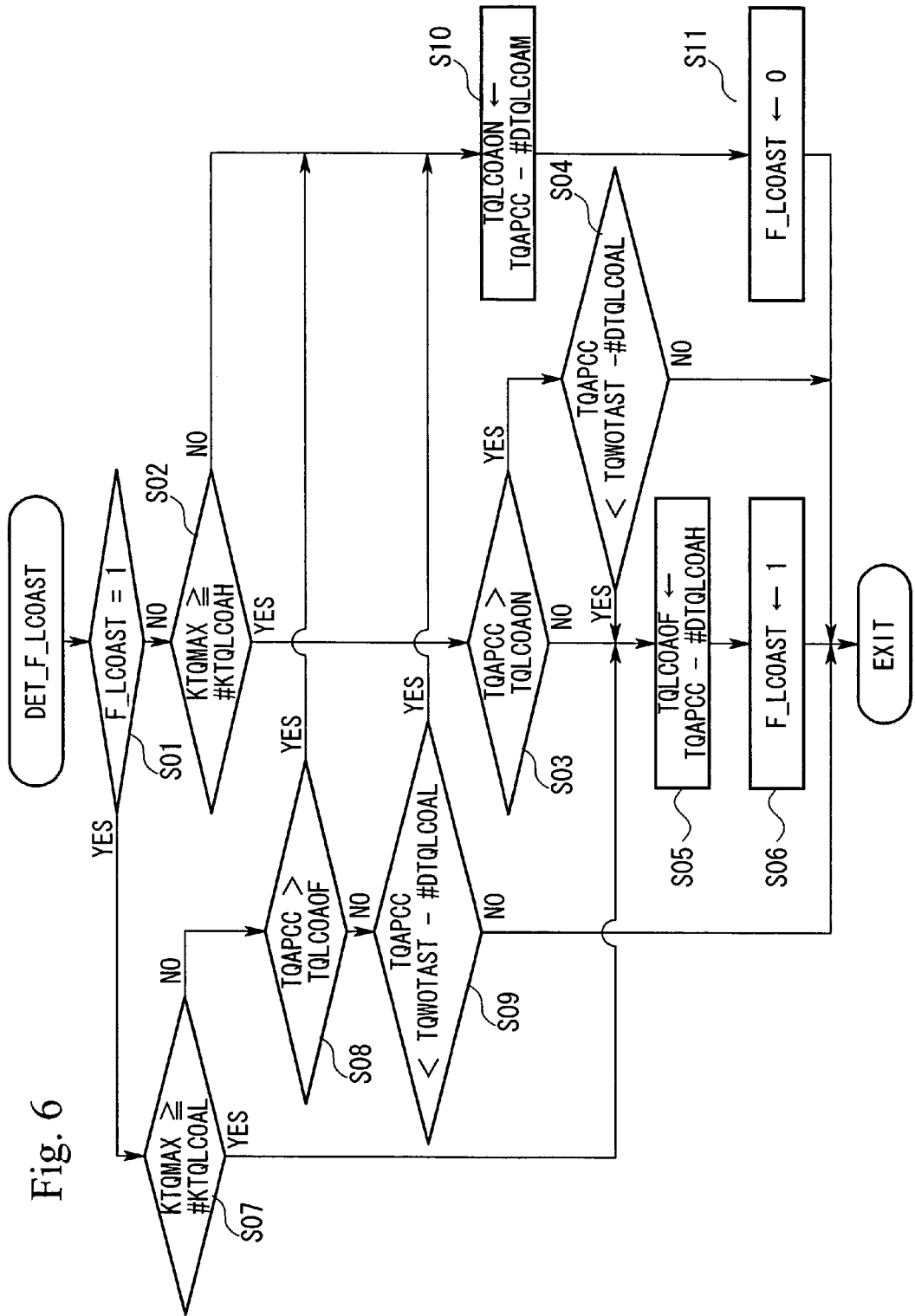
FIG. 6 is a flowchart showing an operation of the control apparatus for a hybrid vehicle of the present embodiment shown in FIG. 1.

Firstly, in step S01 shown in FIG. 6, it is determined whether or not the flag value of the LC_ON assistance flag F_LCOAST which shows that the region of the LC_ON state where the lock-up clutch 21 is set to the engaged state (for example, a region with respect to the accelerator pedal opening AP, and the like) is enlarged, is "1".

If this determination is "YES", the flow proceeds to step S07 described later.

On the other hand, if this determination is "NO", the flow proceeds to step S02.

In step S02, it is determined whether a high load side correction coefficient KTQMAX being a value obtained by dividing an energy management discharge torque limit TQMEMLTD which is a torque limit value corresponding a discharge power limit value set according to the energy state of the high voltage electrical equipment, by a motor maximum torque during WOT assistance, TQMMOT, is greater than a predetermined high side correction coefficient #KTQLCOAH or not. This high load side correction coefficient KTQMAX changes in an increasing trend according to, for example an increase in the state of charge SOC of the battery 3, and becomes 1 when the state of charge SOC is sufficiently large. Moreover, the WOT assistance is a high load assistance which assists the output by the motor M in the high load region of the internal combustion engine E, and is set to operate in the case where, for example the throttle opening related to the operating quantity of the accelerator by the driver exceeds a predetermined assistance trigger threshold.

If the determination in step S02 is "YES", that is in the case where a torque more than the torque corresponding to the predetermined high side correction coefficient #KTQLCOAH is capable of being output by the motor M according to the energy state of the high voltage electrical equipment, the flow proceeds to step S03.

On the other hand, if the determination in step S02 is "NO", the flow proceeds to step S10 described later.

In step S03, it is determined whether a required torque TQAPCC being one of a required torque related to the operating quantity of the accelerator by the driver and a required torque during cruise control, is greater than a torque calculation value during LC_ON, TQLCOAON described later, or not. Regarding the torque calculation value during LC_ON, TQLCOAON, the initial value is set to zero.

If this determination is "NO", the flow proceeds to step S05 described later.

On the other hand, if this determination is "YES", the flow proceeds to step S04.

In step S04, it is determined whether or not a required torque TQAPCC is less than a value obtained for example by subtracting from the WOT assistance start torque TQWOTAST according to the engine speed NE, a predetermined torque subtraction item #DTQLCOAL.

If the determination in step S04 is "NO", the series of processing is terminated.

On the other hand, if the determination in step S04 is "YES", the flow proceeds to step S05.

In step S05, a value obtained by adding to the required torque TQAPCC, a predetermined torque addition item #DTQLCOAH is set to a torque calculation value during LC_OFF, TQLCOAOF.

Next, in step S06, a "1" is set to the flag value of the LC_ON assistance flag F_LCOAST, and the series of processing is terminated.

Moreover, in step S07, it is determined whether the high load side correction coefficient KTQMAX is greater than a predetermined low side correction coefficient #KTQLCOAL (for example, #KTQLCOAL<#KTQLCOAH) or not.

If this determination is "YES", the flow proceeds to step S05 described above.

On the other hand, if this determination is "NO", the flow proceeds to step S08.

In step S08, it is determined whether the required torque TQAPCC is greater than the torque calculation value during LC_OFF, TQLCOAOF or not.

If the determination in step S08 is "NO", that is in the case where, for example due to an increase in the operating quantity of the accelerator by the driver, or the like, the present value of the required torque TQAPCC is increased compared to the required torque TQAPCC in the previous processing, to exceed the predetermined torque addition item #DTQLCOAH, the flow proceeds to step S10 described later.

On the other hand, if the determination in step S08 is "YES", the flow proceeds to step S09.

In step S09, it is determined whether the required torque TQAPCC is less than a value obtained, for example, by subtracting from the WOT assistance start torque TQWOTAST according to the engine speed NE, a predetermined torque subtraction item #DTQLCOAL or not.

If the determination in step S09 is "NO", the series of processing is terminated.

On the other hand, if the determination in step S09 is "YES", that is in the case where, for example, due to a decrease in the operating quantity of the accelerator by the driver, or the like, the required torque TQAPCC is decreased to be exceeded by the WOT assistance start torque TQWOTAST minus the predetermined torque subtraction item #DTQLCOAL, the flow proceeds to step S10

In step S10, a value obtained by subtracting from the required torque TQAPCC being one of, the required torque related the operating quantity of the accelerator by the driver and the required torque during cruise control, a predetermined torque subtraction item #DTQLCOAM, is set to the torque calculation value during LC_ON, TQLCOAON.

Moreover, in step S11, a "0" is set to the flag value of the LC_ON assistance flag F_LCOAST, and the series of processing is terminated.

That is, in the case where the assisting possibility of the motor M is increased accompanying, for example a relatively high state of charge SOC of the battery 3, a "1" is set to the flag value of the LC_ON assistance flag F_LCOAST, and the region of the LC_ON state where the lock-up clutch 21 is set to the engaged state (for example, a region with respect to the accelerator pedal opening AP, and the vehicle speed VP) is enlarged compared to the normal state (the case where the flag value of the LC_ON assistance flag F_LCOAST is "0").

Moreover, in this LC_ON region enlarging state, even in the case where, for example accompanying the power consumption in the motor M, the state of charge SOC of the battery 3 is decreased to exceed a predetermined level, the state is not only shifted from the LC_ON region enlarging state to the normal state, simply according to the determination based on the state of charge SOC, but it is further set to whether or not it is possible to shift from the LC_ON region enlarging state to the normal state, considering a determination based on the required torque TQAPCC.

Furthermore, for example immediately after the state is shifted from the LC_ON region enlarging state to the normal state, since the state of charge SOC of the battery 3 is relatively low, the determination in step S02 described above becomes "NO" so that the flag value of the LC_ON assistance flag F_LCOAST is maintained at "0". Subsequently, for example once the battery 3 is properly charged, the determination in step S02 becomes "YES", and even in the case where the flow proceeds to step S03, in the state where the required torque TQAPCC is large to exceed to a predetermined level, the determination in step S03 becomes "YES" and the determination in step S04 becomes "NO" so that the flag value of the LC_ON assistance flag F_LCOAST is maintained at "0".

That is, the setting is such that, only in the case where the required torque TQAPCC becomes less than the torque calculation value during LC_ON, TQLCOAON depending on for example the decrease in the operating quantity of the accelerator by the driver, or in the case where it is decreased to be exceeded by the WOT assistance start torque TQWOTAST minus the predetermined torque subtraction item #DTQLCOAL, is the state shifted from the normal state to the LC_ON region enlarging state.

As described above, according to the control apparatus for a hybrid vehicle of the present embodiment, when assisting the output from the internal combustion engine by the motor M, in a region according to the accelerator pedal opening AP and the vehicle speed VP, by enlarging the region which maintains the LC_ON state which is the engaged state of the lock-up clutch 21, and by increasing the output of the motor M for the increase in the required torque, it is possible to suppress engagement of the lock-up clutch 21 from being cancelled for a relatively small accelerator pedal opening AP and vehicle speed VP, while maintaining the desired driving force, and it is possible to suppress the occurrence of racing of the internal combustion engine E, so as to improve the fuel consumption efficiency.

Moreover, by controlling the switching between the normal state and the LC_ON region enlarging state based on, for example, the energy state of the high voltage electrical equipment such as the state of charge SOC of the battery 3, and for example the required torque TQAPCC related to the operating quantity of the accelerator of the driver, it is possible to unerringly reflecting the driver's intention with respect to the travelling behavior of the vehicle.

As described above, according to the control apparatus for a hybrid vehicle of the present invention described in the first aspect, by controlling the operating state of the lock-up clutch based on the state of charge of the power storage unit which transfers electric energy with the motor, it is possible to improve the fuel consumption efficiency while maintaining the desired driving force.

Furthermore, according to the control apparatus for a hybrid vehicle of the present invention described in the second aspect, in the case where the torque capable of being output from the motor set according to the state of charge of the power storage unit is relatively large, the frequency of occurrence of a state where the engine rotating speed is rapidly increased due to release of the engaged state of the lock-up clutch, so that the fuel consumption is over increased, can be reduced, so that it is possible to improve the fuel consumption efficiency while maintaining the desired driving force.

Furthermore, according to the control apparatus for a hybrid vehicle of the present invention described in the third aspect, since the operating state of the engagement region enlarging device is not changed simply by the decrease in the state of charge, and furthermore the operating state of the engagement region enlarging device is changed at the point in time when the change in the operating quantity of the accelerator by the driver is detected, then for example in the case where the target torque related to the driver's travelling intention is unchanged, it is possible to prevent the occurrence of torque fluctuations unexpected by the driver, so as to appropriately reflect the driver's intention in the travelling behavior of vehicle.

Furthermore, according to the control apparatus for a hybrid vehicle of the present invention described in the fourth aspect, since the operating state of the engagement region enlarging device is not changed simply by the increase in the state of charge, and furthermore the operating state of the engagement region enlarging device is changed at the point in time when the change in the operating quantity of the accelerator by the driver is detected, then for example it is possible to prevent the occurrence of the lock-up clutch being unnecessarily set to the engaged state in the case where there is an intention of the driver to accelerate, so that the driver's intention can be appropriately reflected in the travelling behavior of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle, the hybrid vehicle:
   an internal-combustion engine and a motor as a power source; and
   a power storage unit which transfers electric energy with said motor, and
   at least one of said internal-combustion engine and said motor is connected to driving wheels of the vehicle through a torque converter having a lock-up clutch, and a transmission, so as to transmit a driving force to said driving wheels,
   wherein the control apparatus of the hybrid vehicle comprises:
   a state of charge detecting device which detects a state of charge of said power storage unit; and
   a lock-up clutch controlling device which controls an operating state of said lock-up clutch based on said state of charge detected by said state of charge detecting device, or a state quantity related to said state of charge,
   wherein said lock-up clutch controlling device includes:
   a lock-up clutch setting device for setting the lock-up clutch in an engaged state when quantities representing the vehicle state are in a predetermined region, and
   an engagement region enlarging device which enlarges said predetermined vehicle state quantity region which sets said lock-up clutch in the engaged state, when said state of charge or the state quantities related to said state of charge is greater than a predetermined first threshold,
   wherein said control apparatus further comprising a canceling device which cancels an operation of said engagement region enlarging device when, while said engagement region enlarging device is in operation, said state of charge or the state quantity related to said state of charge is less than a predetermined second threshold, and a target torque for a power plant torque output from a power plant having said internal combustion engine and said motor is increased greater than a predetermined first torque, or decreased less than a predetermined second torque.

2. A control apparatus for a hybrid vehicle, the hybrid vehicle including:
   an internal-combustion engine and a motor as a power source; and
   a power storage unit which transfers electric energy with said motor, and
   at least one of said internal-combustion engine and said motor is connected to driving wheels of the vehicle through a torque converter having a lock-up clutch, and a transmission, so as to transmit a driving force to said driving wheels,
   wherein the control apparatus of the hybrid vehicle comprises:
   a state of charge detecting device which detects a state of charge of said power storage unit; and
   a lock-up clutch controlling device which controls an operating state of said lock-up clutch based on said state of charge detected by said state of charge detecting device, or a state quantity related to said state of charge,
   wherein said lock-up clutch controlling device includes:
   a lock-up clutch setting device for setting the lock-up clutch in an engaged state when quantities representing the vehicle state is in a predetermined region; and
   an engagement region enlarging device which enlarges said predetermined vehicle state quantity region which sets said lock-up clutch in the engaged state, when said state of charge or the state quantities related to said state of charge is greater than a predetermined first threshold,
   wherein an operating device which operates said engagement region enlarging device when, during said engagement region enlarging device is not in operation, said state of charge or the state quantity related to said state of charge is more than a predetermined first threshold, and a target torque for a power plant torque output from a power plant having said internal combustion engine and said motor is decreased less than a predetermined torque.

* * * * *